US012657340B2

(12) United States Patent
Patel et al.

(10) Patent No.: US 12,657,340 B2
(45) Date of Patent: Jun. 16, 2026

(54) SYSTEM AND METHOD FOR GENERATING DECOY DATA AND SHARDING SENSITIVE DATA UTILIZING QUANTUM COMPUTING

(71) Applicant: Bank of America Corporation, Charlotte, NC (US)

(72) Inventors: Vinesh Premji Patel, Greenwich (GB); Manu Jacob Kurian, Dallas, TX (US); Michael Robert Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 18/830,055

(22) Filed: Sep. 10, 2024

(65) Prior Publication Data

US 2026/0073071 A1 Mar. 12, 2026

(51) Int. Cl.
*G06F 21/62* (2013.01)
*G06N 10/40* (2022.01)

(52) U.S. Cl.
CPC ......... *G06F 21/6245* (2013.01); *G06N 10/40* (2022.01)

(58) Field of Classification Search
CPC ............................. G06F 21/6245; G06N 10/40
USPC ............................................................ 726/5
See application file for complete search history.

(56) References Cited

U.S. PATENT DOCUMENTS

| 7,933,990 B2 | 4/2011 | Munger et al. | |
| 9,501,639 B2 * | 11/2016 | Stolfo .................. | G06F 21/566 |

| 9,836,512 B1 | 12/2017 | Singh et al. | |
| 9,853,999 B2 | 12/2017 | Singh et al. | |
| 9,985,988 B2 | 5/2018 | Gukal et al. | |
| 10,218,741 B2 | 2/2019 | Gopalakrishna | |
| 10,230,745 B2 | 3/2019 | Singh et al. | |
| 10,326,796 B1 | 6/2019 | Varadarajan et al. | |
| 10,362,057 B1 | 7/2019 | Wu | |
| 10,516,533 B2 | 12/2019 | Mannan et al. | |
| 10,594,480 B2 | 3/2020 | Samid | |
| 10,616,344 B2 | 4/2020 | Dahlstrom et al. | |
| 10,887,346 B2 | 1/2021 | Araujo et al. | |
| 10,972,503 B1 * | 4/2021 | Mohan .................. | H04L 63/14 |
| 2017/0250796 A1 | 8/2017 | Samid | |
| 2017/0289191 A1 | 10/2017 | Thioux et al. | |
| 2017/0302691 A1 | 10/2017 | Singh et al. | |

(Continued)

OTHER PUBLICATIONS

Logan O. Mailloux; Using Modeling and Simulation to Study Photon Number Splitting Attacks; IEEE:2016; pp. 2188-2196.*

*Primary Examiner* — Monjur Rahim

(57) ABSTRACT

A system includes a memory configured to store instances of a software application executable on a computing device and a set of sensitive data and a processor operably coupled to the memory and configured to detect an interaction to initiate an execution of user interactions with the set of sensitive data. The processor is further configured to execute one or more generative machine-learning models trained to generatively present sequences of different decoy data to a user in response to an execution of interactions with the different decoy data, partition the set of sensitive data into sets of sharded sensitive data, and transfer the sets of sharded sensitive data to a trusted database and onto a trusted computing node. The processor is further configured to store a log of the generatively presented sequences of different decoy data and the execution of the interactions with the different decoy data.

20 Claims, 3 Drawing Sheets

(56) References Cited

U.S. PATENT DOCUMENTS

| | | |
|---|---|---|
| 2017/0310704 A1 | 10/2017 | Wu et al. |
| 2021/0067553 A1* | 3/2021 | Ries ........................ H04L 63/08 |
| 2022/0232024 A1* | 7/2022 | Kapoor ................... G06F 21/57 |
| 2022/0294816 A1* | 9/2022 | Martin .................. H04L 67/535 |
| 2022/0329627 A1 | 10/2022 | Wu et al. |
| 2023/0370495 A1 | 11/2023 | Deepen et al. |
| 2024/0028748 A1* | 1/2024 | Marcon .............. G06F 11/1469 |
| 2024/0354402 A1* | 10/2024 | Alves Vidal De Seabra .............. H04L 63/1425 |
| 2024/0394705 A1* | 11/2024 | Abdelrahman ...... G06Q 20/389 |

* cited by examiner

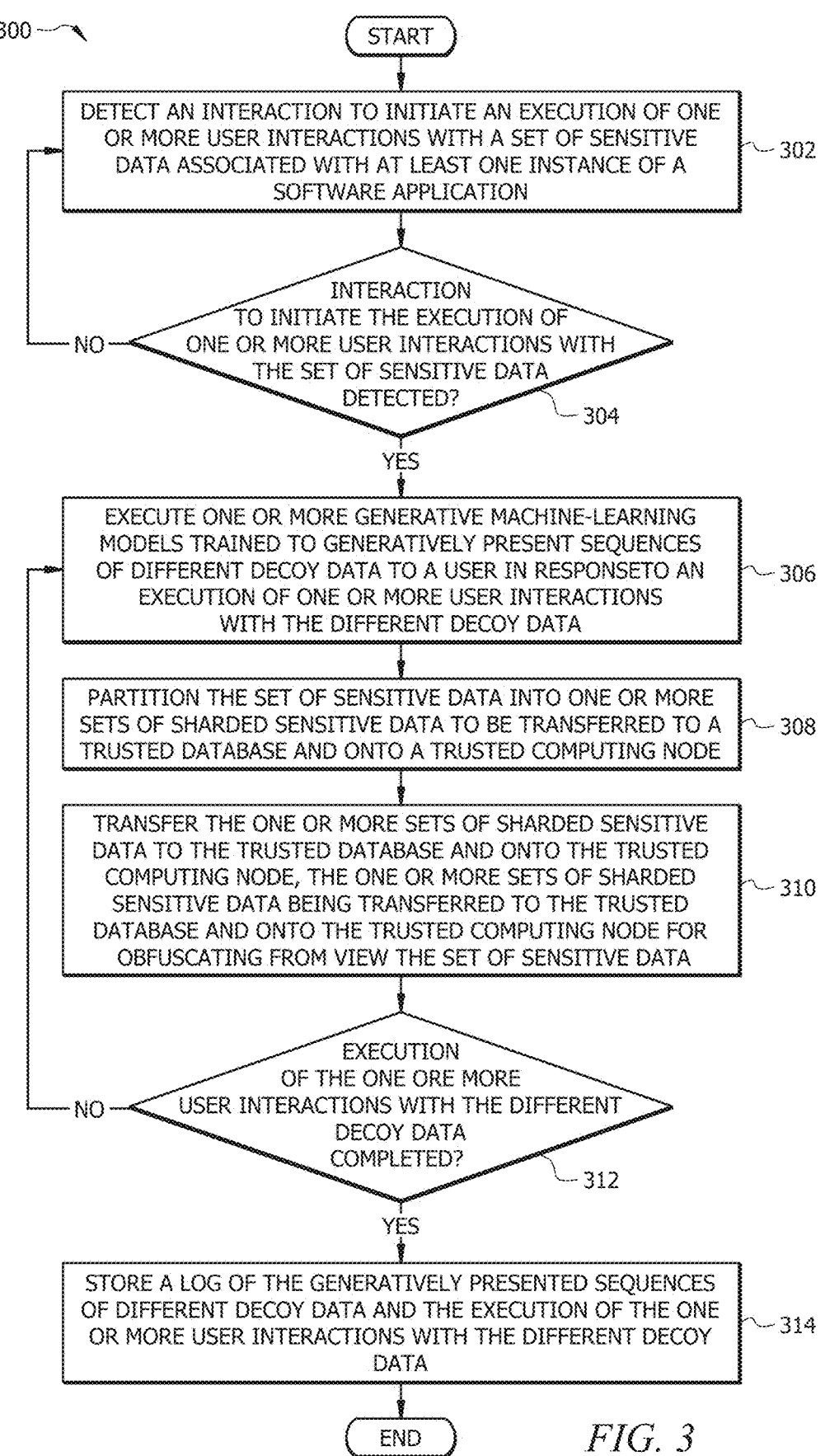

300

START

DETECT AN INTERACTION TO INITIATE AN EXECUTION OF ONE OR MORE USER INTERACTIONS WITH A SET OF SENSITIVE DATA ASSOCIATED WITH AT LEAST ONE INSTANCE OF A SOFTWARE APPLICATION — 302

INTERACTION TO INITIATE THE EXECUTION OF ONE OR MORE USER INTERACTIONS WITH THE SET OF SENSITIVE DATA DETECTED? — 304

NO

YES

EXECUTE ONE OR MORE GENERATIVE MACHINE-LEARNING MODELS TRAINED TO GENERATIVELY PRESENT SEQUENCES OF DIFFERENT DECOY DATA TO A USER IN RESPONSETO AN EXECUTION OF ONE OR MORE USER INTERACTIONS WITH THE DIFFERENT DECOY DATA — 306

PARTITION THE SET OF SENSITIVE DATA INTO ONE OR MORE SETS OF SHARDED SENSITIVE DATA TO BE TRANSFERRED TO A TRUSTED DATABASE AND ONTO A TRUSTED COMPUTING NODE — 308

TRANSFER THE ONE OR MORE SETS OF SHARDED SENSITIVE DATA TO THE TRUSTED DATABASE AND ONTO THE TRUSTED COMPUTING NODE, THE ONE OR MORE SETS OF SHARDED SENSITIVE DATA BEING TRANSFERRED TO THE TRUSTED DATABASE AND ONTO THE TRUSTED COMPUTING NODE FOR OBFUSCATING FROM VIEW THE SET OF SENSITIVE DATA — 310

EXECUTION OF THE ONE ORE MORE USER INTERACTIONS WITH THE DIFFERENT DECOY DATA COMPLETED? — 312

NO

YES

STORE A LOG OF THE GENERATIVELY PRESENTED SEQUENCES OF DIFFERENT DECOY DATA AND THE EXECUTION OF THE ONE OR MORE USER INTERACTIONS WITH THE DIFFERENT DECOY DATA — 314

END

*FIG. 3*

SYSTEM AND METHOD FOR GENERATING DECOY DATA AND SHARDING SENSITIVE DATA UTILIZING QUANTUM COMPUTING

TECHNICAL FIELD

The present disclosure relates generally to quantum computing, and, more specifically, to a system and method for generating decoy data and sharding sensitive data utilizing quantum computing.

BACKGROUND

Certain web-based environments may include data being exchanged and stored across any number of computing systems and databases. For example, the data may include various user data or service data that may be stored to databases associated with respective entities, and that user data or service data may be exchanged between various centralized or decentralized servers and various computing systems for servicing end users. However, such web-based environments may be sometimes subjected to various threats and cyberattacks.

SUMMARY

The system and methods implemented by the system as disclosed in the present disclosure provide technical solutions to the technical problems discussed above by providing systems and methods for generating decoy data and sharding sensitive data utilizing quantum computing. The disclosed system and methods provide several practical applications and technical advantages. Specifically, the present embodiments improve the efficiency, accuracy, speed, and security of intelligent decoy data generation and sensitive data obfuscation, as well as the one or more processors and memory on which the intelligent decoy data generation and sensitive data obfuscation may be executed and stored by accelerating intelligent decoy data generation and sensitive data obfuscation utilizing quantum computing.

The present embodiments provide a combined classical computing and quantum computing system that—in response to the detection of an adversarial interaction to initiate an execution of one or more user interactions with a set of sensitive data—executes one or more machine-learning models (e.g., one or more classical machine-learning (CML) models, one or more quantum machine-learning (QML) models, or some combination thereof) trained to generatively present sequences of different decoy data to an adversarial user in response to an execution of one or more user interactions with the different decoy data.

In particular embodiments, at the same time the one or more machine-learning models (e.g., one or more classical machine-learning (CML) models, one or more quantum machine-learning (QML) models, or some combination thereof) are generatively presenting the sequences of different decoy data to the adversarial user, the combined classical computing and quantum computing system may also partition the set of sensitive data into one or more sets of sharded sensitive data (e.g., by "sharding" or partitioning the larger set of sensitive data into smaller "chunks" of data) and transferring the one or more sets of sharded sensitive data to respective trusted databases and onto respective trusted computing nodes. Specifically, the combined classical computing and quantum computing system may instantiate on a quantum processor one or more quorum computing nodes onto which the one or more sets of sharded sensitive data may be transferred, such that the one or more quorum computing nodes may be separate and distinct from each computing node of a cluster of computing nodes onto which the set of sensitive data previously executed.

In particular embodiments, the one or more quorum computing nodes may store and keep track of the quorum data for maintaining the preexisting quorum established with respect to the cluster of computing nodes onto which the set of sensitive data previously executed. In particular embodiments, once the adversarial user is isolated to interacting with only the generatively presented sequences of different decoy data, the combined classical computing and quantum computing system may further track and store a log of the generatively presented sequences of different decoy data and the execution of the one or more user interactions with the different decoy data for potentially identifying the adversarial user.

Additionally, by utilizing the combined classical computing and quantum computing system, the present embodiments may improve the efficiency and speed of generating decoy data. Specifically, as N quantum bits (QuBits) may represent classical binary settings in $2^N$ simultaneously or in parallel, an N-QuBit quantum computing system may simultaneously explore $2^N$ possible solutions or perform $2^N$ simultaneous or parallel generations of the generatively presented sequences of different decoy data. Specifically, in classical computing systems alone, two classical bits may take only one of four states: 00 or 01 or 10 or 11. Each of the first bit and the second bit combines to represent only one binary configuration at a given time in a classical computing system alone, and thus represents a single binary configuration. However, one QuBit may exist in multiple states simultaneously. That is, the present combined classical computing and quantum computing system performs parallel processing to improve the efficiency and speed of generating decoy data.

In this way, the combined classical computing and quantum computing system increases processing speed and reduces execution time as compared to any classical computing system alone because the combined classical computing and quantum computing system performs $2^N$ parallel operations to generatively present sequences of different decoy data to the adversarial user. Specifically, in accordance with the presently disclosed embodiments, the combined classical computing and quantum computing system may generate the sequences of different decoy data at a fast enough rate (e.g., in real-time) so as to induce and prompt the adversarial user to continue interacting with the generatively presented sequences of different decoy data. This allows the adversarial user's interactions to be tracked and recorded. That is, because the combined classical computing and quantum computing system increases processing speed with respect to generating the sequences of different decoy, an adversarial user may be more likely to believe to be interacting with "real" or sensitive data as opposed to the generatively presented sequences of different decoy data, and thus may be prompted and induced to continue interacting with decoy data.

The present embodiments are directed to systems and methods for generating decoy data and sharding sensitive data utilizing quantum computing. In particular embodiments, a system includes a memory configured to store one or more instances of a software application executable on a computing device and a set of sensitive data associated with at least one instance of the software application. In particular embodiments, the system may further include one or more processors operably coupled to the memory and configured to detect an interaction to initiate an execution of one or more user interactions with the set of sensitive data associated with the at least one instance of the software application. In one embodiment, the one or more processors may be configured to detect the interaction to initiate the execution of one or more user interactions with the set of sensitive data as corresponding to an adversarial interaction.

In particular embodiments, the one or more processors may be further configured to execute one or more generative machine-learning models trained to generatively present sequences of different decoy data to a user in response to an execution of one or more user interactions with the different decoy data. For example, in one embodiment, the one or more generative machine-learning models may include one or more classical machine-learning (CML) models, one or more quantum machine-learning (QML) models, or a combination thereof. In particular embodiments, the one or more processors may be configured to uniquely identify the user based at least in part on the generatively presented sequences of different decoy data and the execution of the one or more user interactions with the different decoy data.

In particular embodiments, the one or more processors may be further configured to partition the set of sensitive data into one or more sets of sharded sensitive data to be transferred to a trusted database and onto a trusted computing node. In particular embodiments, the one or more processors may be further configured to transfer the one or more sets of sharded sensitive data to the trusted database and onto the trusted computing node. For example, in one embodiment, the one or more sets of sharded sensitive data may be transferred to the trusted database and onto the trusted computing node for obfuscating from view the set of sensitive data.

In particular embodiments, the one or more processors may be further configured to transfer the one or more sets of sharded sensitive data to the trusted database and onto the trusted computing node to transfer the one or more sets of sharded sensitive data to a distinct quorum computing node. In particular embodiments, the one or more processors may be further configured to store the one or more sets of sharded sensitive data as one or more quantum bits (QuBits) of data to a quantum memory of the system or as one or more bits of data to a relational database of the system.

In one embodiment, the one or more sets of sharded sensitive data may include one of a plurality of sets of sharded sensitive data into which the set of sensitive data may be partitioned. In particular embodiments, the one or more processors may be further configured to, prior to detecting the interaction to initiate the execution of one or more user interactions with the set of sensitive data, train the one or more generative machine-learning models based at least in part on the plurality of sets of sharded sensitive data. In particular embodiments, in response to determining at least a partial completion of the execution of the one or more user interactions with the different decoy data, the one or more processors may be further configured to store a log of the generatively presented sequences of different decoy data and the execution of the one or more user interactions with the different decoy data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

4

Figure 1:
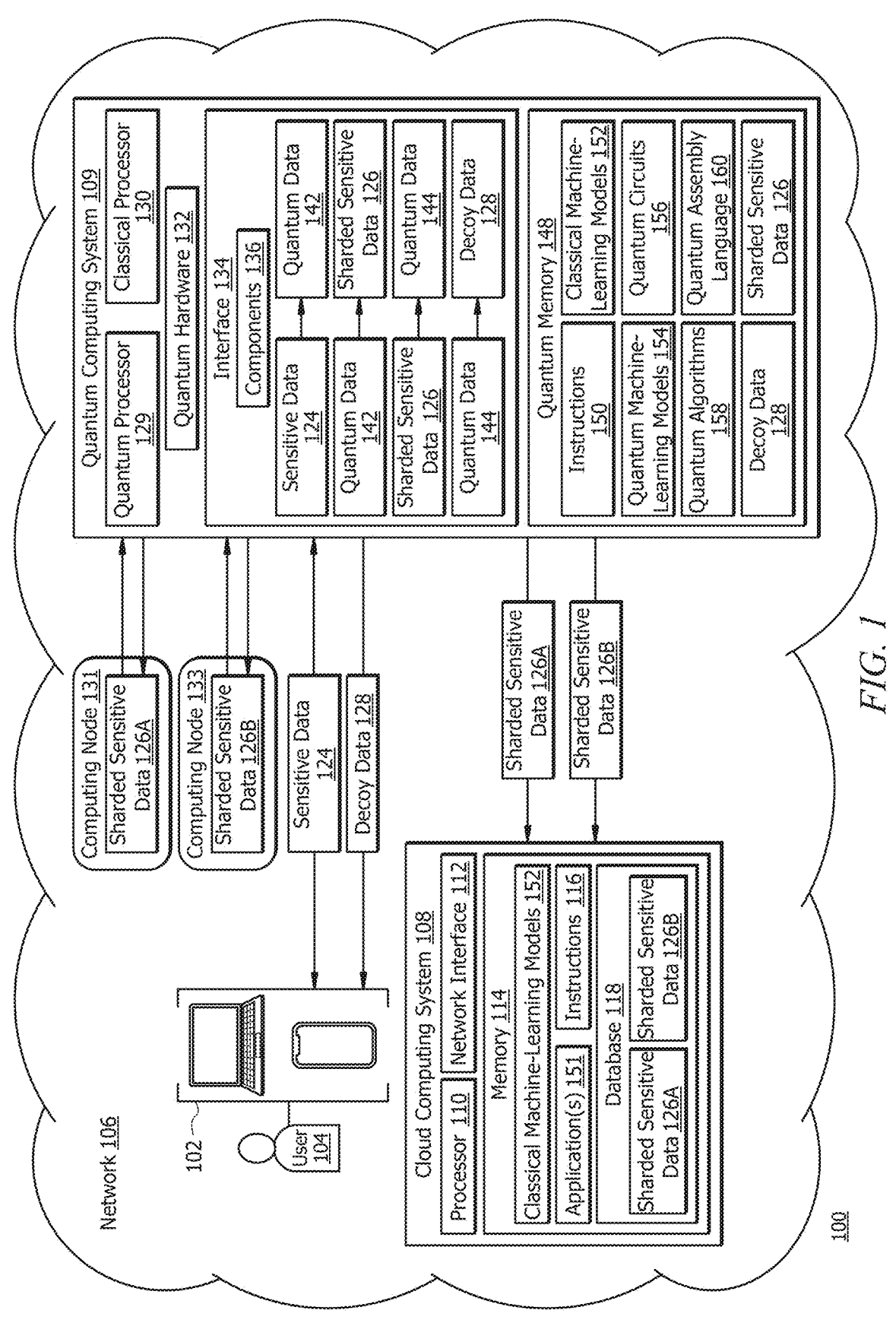
Figure 2:
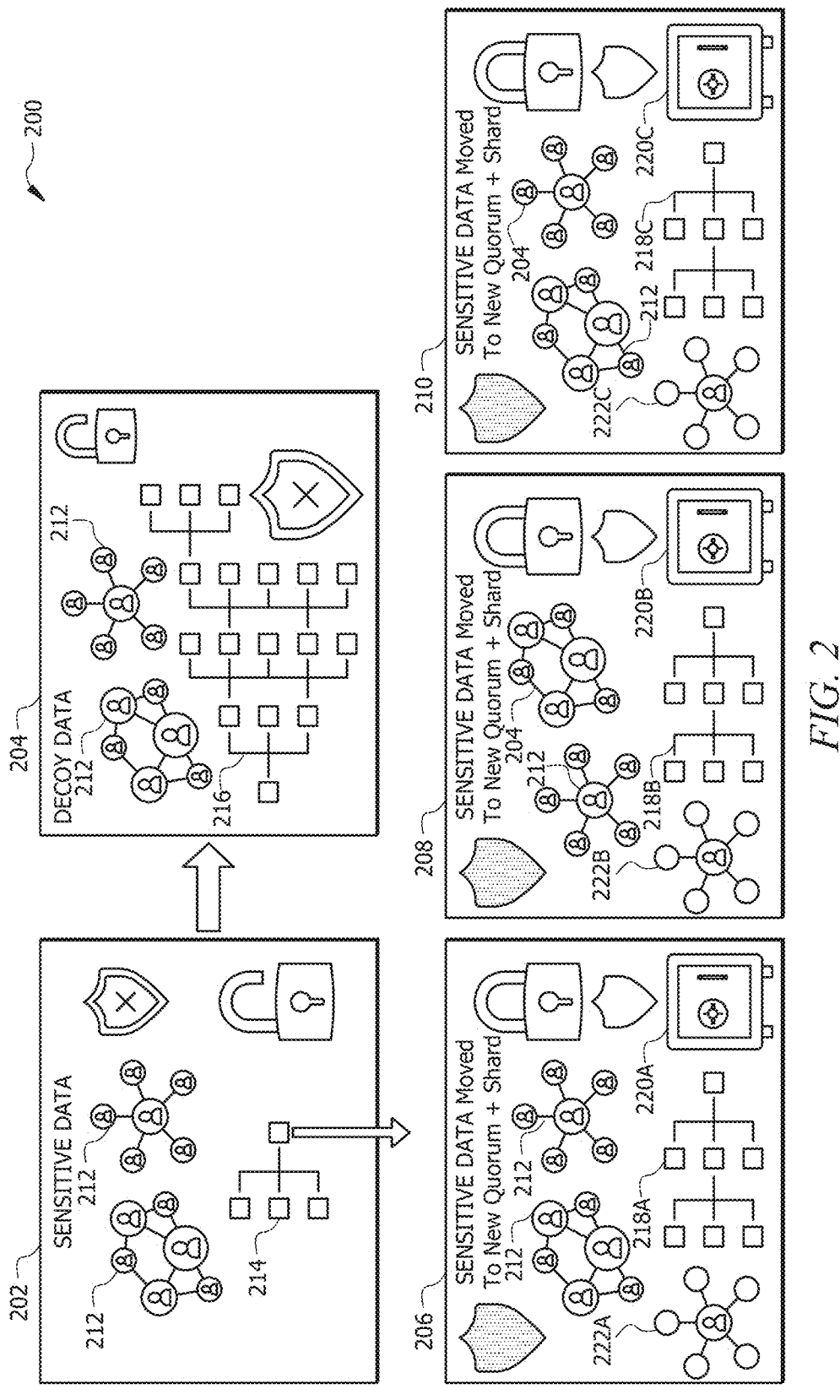

FIG. 1 is a block diagram of a combined classical computing and quantum computing system and network, in accordance with certain aspects of the present disclosure;

FIG. 2 illustrates a diagram of one or more running examples of generating decoy data and sharding sensitive data, in accordance with one or more embodiments of the present disclosure; and FIG. 3 illustrates a flowchart of an example method for generating decoy data and sharding sensitive data utilizing quantum computing, in accordance with one or more embodiments of the present disclosure.

DETAILED DESCRIPTION

Example System

System Overview

FIG. 1 is a block diagram of a combined classical computing and quantum computing system 100. As depicted, the combined classical computing and quantum computing system 100 may include one or more computing devices 102 that may be associated with a user 104, a cloud computing system 108, a quantum computing system 109, and a network 106 that enables the communications between the one or more computing devices 102, the cloud computing system 108, and the quantum computing system 109. In particular embodiments, the cloud computing system 108 and the quantum computing system 109 may be owned and managed by a single entity or organization, and thus, in some embodiments, the cloud computing system 108 and the quantum computing system 109 may operate in conjunction and/or may be integrated to operate as a singular computing infrastructure. In general, the combined classical computing and quantum computing system 100 may be utilized to generate decoy data 128 and shard sensitive data 124 in response to the detection of an adversarial interaction to initiate an execution of one or more user interactions with the sensitive data 124.

In another embodiment, one of the cloud computing system 108 and the quantum computing system 109 may be owned and managed by the single entity or organization while the other one of the cloud computing system 108 and the quantum computing system 109 may be owned and managed by a third-party entity or organization and licensed to be utilized by the single entity or organization. In one embodiment, the cloud computing system 108 may include a classical computing system suitable for executing binary or bitwise processing operations. In contrast, the quantum computing system 109 may include a quantum computing system suitable for executing superposed and entangled or quantum bit (QuBit) based parallel processing operations.

Network

Network 106 may be any suitable type of wireless and/or wired network. The network 106 may or may not be connected to the Internet or public network. The network 106 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near field communication (NFC) network, and/or any other suitable network. The network 106 may be configured to support any suitable type of communication protocol as would be appreciated by one of ordinary skill in the art.

Computing Device

Computing device 102 is generally any device that may be utilized to process data and interact with a user 104. Examples of the computing device 102 include, but are not limited to, a personal computer, a desktop computer, a workstation, a server, a laptop, a tablet computer, a mobile phone (such as a smartphone), etc. The computing device 102 may include a user interface, such as a display, a microphone, keypad, or other appropriate terminal equipment usable by the user 104. The computing device 102 may include a hardware processor, memory, and/or circuitry (not explicitly shown) configured to perform any of the functions or actions of the computing device 102 described herein. For example, a software application designed using software code may be stored in the memory and executed by the processor to perform the functions of the computing device 102. The computing device 102 may be utilized to communicate with other components of the system 100 via the network 106.

In particular embodiments, the computing device 102 may be utilized by the user 104 to communicate and exchange sensitive data 124 to the quantum computing system 109 and/or the cloud computing system 108. For example, in one embodiment, the computing device 102 may execute an instance of a software application 151 that may be hosted and executed by the cloud computing system 108. In particular embodiments, the user 104 may access the instance of the software application 151 executing on the computing device 102 and exchange sensitive data 124 (e.g., one or more requests and/or replies) over the network 106 between the computing device 102 and the quantum computing system 109 and/or the cloud computing system 108. As will be discussed in greater detail below, the computing device 102 and/or an instance of the software application 151 executing on the computing device 102 may be accessed or interacted with by, for example, a potential attacker, an eavesdropper, or other adversarial user. Without the presently disclosed embodiments, the potential attacker, eavesdropper, or other adversarial user would otherwise gain access and view of the sensitive data 124.

Cloud Computing System

The cloud computing system 108 may include any computing that may be utilized to process data and communicate with other components of the system 100 via the network 106. In one embodiment, the cloud computing system 108 may include a classical computing system suitable for executing binary or bitwise processing operations. As depicted, the cloud computing system 108 may include a processor 110 in signal communication with a memory 114 and a network interface 112.

Processor 110 may include one or more processors operably coupled to the memory 114. The processor 110 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 110 may be a programmable logic device, a microcontroller, a microprocessor, or any suitable combination of the preceding. The one or more processors 110 may be utilized to process data and may be implemented in hardware or software.

For example, the processor 110 may be 8-bit, 16-bit, 32-bit, 64-bit, or of any other suitable architecture. The one or more processors 110 may be utilized to implement various software instructions to perform the operations described herein. For example, the one or more processors 110 may be utilized to execute software instructions 116 and perform one or more functions described herein. In one embodiment, the processor 110 may be understood to be a classical processor.

Network interface 112 may be utilized to enable wired and/or wireless communications (e.g., via network 106). The network interface 112 is configured to communicate data between the cloud computing system 108 and other components of the system 100. For example, the network interface 112 may include a WIFI interface, a local area network (LAN) interface, a wide area network (WAN) interface, a modem, a switch, or a router. The processor 110 may be utilized to send and receive data using the network interface 112. The network interface 112 may be utilized to use any suitable type of communication protocol as would be appreciated by one of ordinary skill in the art.

Memory 114 may be volatile or non-volatile and may include a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. The memory 114 may store any of the information described in FIGS. 1-3 along with any other data, instructions, logic, rules, or code operable to implement the function(s) described herein. The memory 114 is operable to store software instructions 116, and/or any other data and instructions.

The software instructions 116 may include any suitable set of software instructions, logic, rules, or code operable to be executed by the processor 110. In particular embodiments, the memory 114 may further store a database 118, which may include a structured data base (e.g., structured query language (SQL) database, a non-SQL database, or other similar relational database), an unstructured database, a sorted data structure, or an unsorted data structure. In one embodiment, the memory 114 may be understood to be a classical memory. In one embodiment, the memory 114 may include a non-transitory computer-readable medium.

In particular embodiments, the database 118 may store sharded sensitive data 126A and sharded sensitive data 126B. For example, as will be discussed in greater detail below with respect to FIG. 2, in response to the detection of an adversarial interaction to initiate an execution of one or more user interactions with the sensitive data 124, the quantum computing system 109 may partition (e.g., "shard") the sensitive data 124 into a set of sharded sensitive data 126A and a set of sharded sensitive data 126B (e.g., by "sharding" or partitioning the larger set of sensitive data 124 into smaller "chunks" of sensitive data) and transferring the set of sharded sensitive data 126A and the set of sharded sensitive data 126B to the database 118 (e.g., trusted database).

For example, in one embodiment, the database 118 and/or the quantum memory 148 may instantiate one or more individualized memory instances within the database 118 and/or the quantum memory 148, and thus the set of sharded sensitive data 126A and the set of sharded sensitive data 126B may be stored to respective memory instances to further obfuscate the set of sharded sensitive data 126A and the set of sharded sensitive data 126B from view by, for example, a potential attacker, an eavesdropper, or other adversarial user that may have otherwise gained access to the sensitive data 124 by infiltration of the computing device 102 and/or an instance of the software application 151 executing on the computing device 102. As will be further discussed below, in addition to transferring the set of sharded sensitive data 126A and the set of sharded sensitive data 126B to the database 118 (e.g., trusted database), the quantum computing system 109 may also transfer the set of sharded sensitive data 126A and the set of sharded sensitive data 126B onto respective quorum computing nodes 131 and 133 (e.g., trusted computing nodes).

Quantum Computing System

The quantum computing system 109 may include any quantum computing system that may be utilized to process data and communicate with other components of the system 100 via the network 106. In one embodiment, the quantum computing system 109 may include a quantum computing system suitable for executing superposed and entangled or quantum bit (QuBit) based parallel processing operations. As depicted, the quantum computing system 109 may include a quantum processor 129, a classical processor 130, and an interface 134 in signal communication with a quantum memory 148.

The quantum processor 129 may include one or more quantum processors operably coupled to the quantum memory 148. The quantum processor 129 is configured to process quantum bits (QuBits). The quantum processor 129 may include a superconducting quantum device (with QuBits implemented by states of Josephson junctions), a trapped ion device (with qubits implemented by internal states of trapped ions), a trapped neutral atom device (with QuBits implemented by internal states of trapped neutral atoms), a photon-based device (with QuBits implemented by modes of photons), or any other suitable device that implements quantum bits with states of a respective quantum system.

In particular embodiments, the quantum processor 129 may be a quantum processing unit (QPU), which may include a number of quantum registers, a dedicated quantum memory, and a number of quantum logic gates (e.g., a quantum logic gate, a Hadamard logic gate, a Pauli-X logic gate, a Pauli-Y logic gate, a Pauli-Z logic gate, a controlled NOT logic gate, and so forth) suitable for executing superposed and entangled or quantum bit (QuBit) based parallel processing operations.

In particular embodiments, the quantum processor 129 may be further utilized to perform quantum computations, such as quantum annealing, quantum simulations, and universal quantum computing. For example, in particular embodiments, the quantum processor 129 may, in conjunction with the quantum memory 148 and utilizing the quantum hardware 132, execute one or more classical machine-learning (CML) models 152, one or more quantum machine-learning (QML) models 154, one or more quantum circuits 156, one or more quantum algorithms 158, and/or one or more quantum assembly languages 160 for performing operations on the sensitive data 124 and the sets of sharded sensitive data 126.

In particular embodiments, the one or more classical machine-learning (CML) models 152 may include, for example, one or more of a spiking neural network (SNN), an autoencoder (AE), a variational autoencoder (VAE), a generative adversarial network (GAN), a convolutional neural network (CNN), a deep neural network (DNN), a deep convolutional neural network (DCNN), a graph neural network (GNN), a graph convolutional network (GCN), a bidirectional and auto-regressive transformer (BART) model, a bidirectional encoder representations for transformer (BERT) model, a generative pre-trained transformer (GPT) model, a graph transformer, or other similar machine-learning model. In another embodiment, the one or more classical machine-learning (CML) models 152 may include one or more language models (LMs) or large language model (LLMs).

Similarly, in particular embodiments, the one or more quantum machine-learning (QML) models 154 may include one or more of a quantum-enhanced machine-learning model, a quantum-inspired machine-learning model, a quantum-generalized machine-learning model, or any of various other machine-learning models in which the processing power of quantum computing and the properties of quantum physics are utilized to accelerate machine-learning tasks. Specifically, it should be appreciated that the quantum computing system 109 may be capable of executing both the one or more classical machine-learning (CML) models 152 and the one or more quantum machine-learning (QML) models 154 in accordance with the presently disclosed embodiments. On the other hand, the cloud computing system 108 may be capable of executing only the one or more classical machine-learning (CML) models 152.

In particular embodiments, the quantum hardware 132 may include, for example, a number of quantum bits (QuBits), a number of QuBit connectors, a number of QuBit interconnector circuits for control operations, and a quantum random access memory (QRAM). The one or more quantum circuits 156 may include a sequence of quantum logic gates suitable for representing and expressing each step of the one or more one or more quantum algorithms 158. For example, the one or more quantum algorithms 158 may include any of various quantum algorithms, such as quantum annealing algorithms, quantum simulation algorithms, quantum search algorithms (e.g., Grover's algorithm), quantum cryptography algorithms (e.g., Shor's algorithm), one or more quantum Fourier transform (QFT) based algorithms or inverse quantum Fourier transform (iQFT) based algorithms, one or more classical quantum hybrid algorithms (e.g., Quantum Eigensolver), one or more classical quantum variational algorithms, one or more post-quantum cryptographic algorithms (e.g., quantum-resistant encryption algorithms), and/or other user-developed quantum algorithms that may be represented by instructions 150.

The classical processor 130 may include one or more processors operably coupled to the quantum memory 148. The classical processor 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The classical processor 130 may be a programmable logic device, a microcontroller, a microprocessor, or any suitable combination of the preceding. The one or more processors are configured to process data and may be implemented in hardware or software. For example, the classical processor 130 may be 8-bit, 16-bit, 32-bit, 64-bit, or of any other suitable architecture. The one or more processors are configured to implement various software instructions to perform the operations described herein.

The interface 134 may be utilized to convert data items represented by classical binary bits of data into to quantum bits (QuBits) of data. For example, in particular embodiments, the interface 134 may convert sensitive data 124 represented as classical binary bits of data into quantum data 142 for inputting into the one or more QML models 154, and, similarly, convert sharded sensitive data 126 represented as classical binary bits of data into quantum data 144 for inputting into the one or more QML models 154, for example.

In particular embodiments, the interface 134 may be further utilized to convert data items represented by quantum bits (QuBits) of data into classical binary bits of data. For example, in particular embodiments, upon the quantum computing system 109 extracting data from the sensitive data 124 based on the quantum data 142, the interface 134 may convert the quantum data 142 representing the sharded sensitive data 126 into classical binary bits of data representing the sharded sensitive data 126. Likewise, upon the quantum computing system 109 generating decoy data 128 based on the quantum data 144, the interface 134 may convert the quantum data 144 representing the decoy data 128 into classical binary bits of data representing the decoy data 128.

In particular embodiments, the interface 134 may include a number of components 136 that may be utilized to generate and manipulate quantum bits (QuBits). In the illustrated embodiment, the number of components 136 and the quantum processor 129 are configured to operate on a same type of quantum bits (QuBits). For example, when the quantum processor 129 includes a photon-based device (with qubits implemented by modes of photons), the number of components 136 may include optical components such as lasers, mirrors, prisms, waveguides, interferometers, optical fibers, filters, polarizers, and/or lenses.

In particular embodiments, the quantum computing system 109 may utilize the one or more classical machine-learning (CML) models 152, the one or more quantum machine-learning (QML) models 154, or some combination thereof to generatively present sequences of different decoy data 128 to an adversarial user in response to an execution of one or more user interactions with the different decoy data 128. For example, as will be discussed in greater detail below with respect to FIG. 2, the one or more classical machine-learning (CML) models 152, the one or more quantum machine-learning (QML) models 154, or some combination thereof may be trained to generate a generative data structure sequence (e.g., a file path, a document content, a linked list, a stack, a queue, a graph, a breadcrumb, a sequence of webpages, a sequence of command screens, a sequence of numbers, a sequence of source code scripts, and so forth) as the sequences of different decoy data 128.

In particular embodiments, as previously noted, the quantum computing system 109 may also transfer the set of sharded sensitive data 126A and the set of sharded sensitive data 126B onto respective quorum computing nodes 131 and 133 (e.g., trusted computing nodes). For example, in particular embodiments, the quantum processor 129 may instantiate the respective quorum computing nodes 131 and 133 (e.g., trusted computing nodes), which may include, for example, respective virtual compute instances that may be isolated from any computing nodes of a cluster of computing nodes on the quantum processor 129 or the classical processor 130 on which the sensitive data 124 may have been previously executing.

In particular embodiments, as further depicted, the set of sharded sensitive data 126A and the set of sharded sensitive data 126B may be then transferred onto the respective quorum computing nodes 131 and 133 (e.g., trusted computing nodes) to obfuscate the set of sharded sensitive data 126A and the set of sharded sensitive data 126B from view by, for example, a potential attacker, an eavesdropper, or other adversarial user that may have otherwise gained access to the sensitive data 124.

Quantum memory 148 may include a quantum read-only memory (QROM), quantum random-access memory (QRAM), or other similar quantum memory. The quantum memory 148 may store any of the information described in FIGS. 1 and 2 along with any other data, instructions, logic, rules, or code operable to implement the function(s) described herein. The quantum memory 148 is operable to store software instructions 150, and/or any other data and instructions. The software instructions 150 may include any suitable set of software instructions, logic, rules, or code operable to be executed by the quantum processor 129. In one embodiment, the quantum memory 148 may include a non-transitory computer-readable medium.

Generating Decoy Data and Sharding Sensitive Data Utilizing Quantum Computing FIG. 2 illustrates a diagram 200 of one or more running examples 202, 204, 206, 208, and 210 of generating decoy data and sharding sensitive data, in accordance with certain aspects of the present disclosure. In particular embodiments, the one or more running examples 202, 204, 206, 208, and 210 may be illustrative of a workflow performed utilizing the combined classical computing and quantum computing system 100 as described above with respect to FIG. 1. As depicted by running example 202, as part of nominal operations, a cluster of computing nodes 212 may act upon a set of sensitive data 214 as part of the execution of a software application (e.g., software application 151) executing on the cluster of computing nodes 212. In particular embodiments, each computing node (e.g., a virtual compute instance) of the cluster of computing nodes 212 may be hosted and executed on the quantum processor 129.

In particular embodiments, during the nominal operations, the combined classical computing and quantum computing system 100 may detect an adversarial interaction (e.g., cyberattack or other similar cyber threat by an adversarial user) to initiate an execution of one or more user interactions with the set of sensitive data 214. For example, in one embodiment, the adversarial interaction may include a "hacking" of the set of sensitive data 214, an eavesdropping of the set of sensitive data 214, or other similar adversarial interaction (e.g., password guessing, router "hacking," codebase "hacking," AI "bot" or AI agent snooping pr eavesdropping, and so forth) leading to a potential data breach or software application outage.

In particular embodiments, upon the combined classical computing and quantum computing system 100 detecting the adversarial interaction, as further depicted the running example 204, the combined classical computing and quantum computing system 100 may then execute one or more generative machine-learning models (e.g., the one or more classical machine-learning (CML) models 152, the one or more quantum machine-learning (QML) models 154, or a combination thereof) trained to generatively present sequences of different decoy data 216 to the adversarial user in response to an execution of one or more user interactions with the different decoy data 216.

For example, in particular embodiments, the one or more generative machine-learning models (e.g., the one or more classical machine-learning (CML) models 152, the one or more quantum machine-learning (QML) models 154, or a combination thereof) may be trained to generate a generative data structure sequence as the sequences of different decoy data 216. For example, in one embodiment, generative data structure sequence may include one or more of a file path, a document content, a linked list, a stack, a queue, a graph, a breadcrumb, a sequence of webpages, a sequence of command screens, a sequence of numbers, a sequence of source code scripts, or other similar decoy data 216 in which the presentation and exchange of data follows a sequential order or a quasi-sequential order to iteratively and dynamically prompt the adversarial user to continue to interact and engage with the sequences of different decoy data 216 over some period of time.

In particular embodiments, the combined classical computing and quantum computing system 100 may monitor and track the adversarial user's interactions with the sequences of different decoy data 216 and store a log of the generatively presented sequences of different decoy data 216 and the adversarial user's interactions with the sequences of different decoy data 216 for uniquely identifying the adversarial user.

In particular embodiments, while the combined classical computing and quantum computing system 100 is generatively present the sequences of different decoy data 216 to the adversarial user, as further depicted by running examples 206, 208, and 210, the combined classical computing and quantum computing system 100 may further partition the set of sensitive data 214 into one or more sets of sharded sensitive data 218A, 218B, and 218C (e.g., by "sharding" or partitioning the larger set of sensitive data 214 into smaller "chunks" of sensitive data) to be transferred to one or more trusted databases 220A, 220B, and 220C (e.g., individual instances of memory that may be implemented on the quantum memory 148) and onto one or more trusted computing nodes 222A, 222B, and 222C.

Specifically, the combined classical computing and quantum computing system 100 may transfer the one or more sets of sharded sensitive data 218A, 218B, and 218C to the one or more trusted databases 220A, 220B, and 220C and onto the one or more trusted computing nodes 222A, 222B, and 222C for obfuscating from view the set of sensitive data 214. In one embodiment, as further illustrated by running examples 206, 208, and 210, each set of the one or more sets of sharded sensitive data 218A, 218B, and 218C may be transferred to a respective one of the one or more trusted databases 220A, 220B, and 220C and onto a respective one of the one or more trusted computing nodes 222A, 222B, and 222C.

In another embodiment, each set of the one or more sets of sharded sensitive data 218A, 218B, and 218C may be periodically transferred to different ones of the one or more trusted databases 220A, 220B, and 220C and onto different ones of the one or more trusted computing nodes 222A, 222B, and 222C so as to further reduce the possibility of future adversarial interaction (e.g., password guessing, router "hacking," codebase "hacking," AI "bot" or AI agent snooping and eavesdropping, and so forth).

For example, in particular embodiments, the combined classical computing and quantum computing system 100 may instantiate on the quantum processor 129 one or more dedicated quorum computing nodes (e.g., quorum computing nodes 131 and 133) onto which the one or more sets of sharded sensitive data 218A, 218B, and 218C may be transferred, such that the one or more dedicated quorum computing nodes (e.g., quorum computing nodes 131 and 133) may be separate and distinct from each computing node of the cluster of computing nodes 212 without disturbance to any preexisting quorum established between the cluster of computing nodes 212. For example, as depicted, each of the one or more trusted computing nodes 222A, 222B, and 222C may belong to its own cluster.

Specifically, the one or more dedicated quorum computing nodes (e.g., quorum computing nodes 131 and 133) may maintain and keep track of the quorum of the cluster of computing nodes 212 even after the one or more sets of sharded sensitive data 218A, 218B, and 218C are transferred. For example, in one embodiment, the one or more dedicated quorum computing nodes (e.g., quorum computing nodes 131 and 133) may store quorum data for maintaining the preexisting quorum established with respect to the cluster of computing nodes 212.

FIG. 3 illustrates a flowchart of an example method 300 for generating decoy data and sharding sensitive data utilizing quantum computing, in accordance with one or more embodiments of the present disclosure. The method 300 may be performed by the combined classical computing and quantum computing system 100 as described above with respect to FIG. 1. For example, in one embodiment, the method 300 may be performed by the cloud computing system 108 alone. In another embodiment, the method 300 may be performed by the quantum computing system 109 alone. In yet another embodiment, the method 300 may be performed in conjunction by the cloud computing system 108 and the quantum computing system 109.

The method 300 may begin at block 302 with the cloud computing system 108 and/or the quantum computing system 109 detecting an interaction to initiate an execution of one or more user interactions with a set of sensitive data associated with at least one instance of a software application. For example, in one embodiment, the combined classical computing and quantum computing system 100 may detect an adversarial interaction (e.g., cyberattack or other similar cyber threat by an adversarial user) to initiate an execution of one or more user interactions with the set of sensitive data 214. In particular embodiments, the method 300 may continue at decision 304 with the cloud computing system 108 and/or the quantum computing system 109 confirming whether the interaction to initiate the execution of one or more user interactions with the set of sensitive data has been detected. In particular embodiments, in response to confirming that the interaction to initiate the execution of one or more user interactions with the set of sensitive data has not been detected (e.g., at decision 304), the method 300 may return to block 302.

On the other hand, in response to confirming that the interaction to initiate the execution of one or more user interactions with the set of sensitive data has been detected (e.g., at decision 304), the method 300 may continue at block 306 with the cloud computing system 108 and/or the quantum computing system 109 executing one or more generative machine-learning models trained to generatively present sequences of different decoy data to a user in response to an execution of one or more user interactions with the different decoy data. For example, in particular embodiments, the combined classical computing and quantum computing system 100 may execute the one or more classical machine-learning (CML) models 152, the one or more quantum machine-learning (QML) models 154, or a combination thereof to generatively present sequences of different decoy data 216 to the adversarial user in response to an execution of one or more user interactions with the different decoy data 216.

In particular embodiments, the method 300 may continue at block 308 with the cloud computing system 108 and/or the quantum computing system 109 partitioning the set of sensitive data into one or more sets of sharded sensitive data to be transferred to a trusted database and onto a trusted computing node. For example, in particular embodiments, the combined classical computing and quantum computing system 100 may partition the set of sensitive data 214 into one or more sets of sharded sensitive data 218A, 218B, and 218C. In particular embodiments, the method 300 may continue at block 310 with the cloud computing system 108 and/or the quantum computing system 109 transferring the one or more sets of sharded sensitive data to the trusted database and onto the trusted computing node.

For example, in particular embodiments, the combined classical computing and quantum computing system 100 may transfer the one or more sets of sharded sensitive data 218A, 218B, and 218C to the one or more trusted databases 220A, 220B, and 220C and onto the one or more trusted computing nodes 222A, 222B, and 222C for obfuscating from view the set of sensitive data 214. In particular embodiments, the method 300 may continue at decision 312 with the cloud computing system 108 and/or the quantum computing system 109 confirming whether the execution of the one or more user interactions with the different decoy data has been completed.

In particular embodiments, in response to confirming that the execution of the one or more user interactions with the different decoy data has not been completed (e.g., at decision 312), the method 300 may return to block 306. On the other hand, in response to confirming that the execution of the one or more user interactions with the different decoy data has been completed (e.g., at decision 312), the method 300 may conclude at block 314 with the cloud computing system 108 and/or the quantum computing system 109 storing a log of the generatively presented sequences of different decoy data and the execution of the one or more user interactions with the different decoy data.

For example, the combined classical computing and quantum computing system 100 may monitor and track the adversarial user's interactions with the sequences of different decoy data 216 and store a log of the generatively presented sequences of different decoy data 216 and the adversarial user's interactions with the sequences of different decoy data 216 for uniquely identifying the adversarial user.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
   a memory configured to store one or more instances of a software application executable on a computing device and a set of sensitive data associated with at least one instance of the software application; and
   one or more processors operably coupled to the memory and configured to:
      detect an interaction to initiate an execution of one or more user interactions with the set of sensitive data associated with the at least one instance of the software application, and, in response:
      execute one or more generative machine-learning models trained to generatively present sequences of different decoy data to a user in response to an execution of one or more user interactions with the different decoy data; and
      while generatively presenting the sequences of different decoy data to the user:
         partition the set of sensitive data into one or more sets of sharded sensitive data to be transferred to a trusted database of a predetermined plurality of trusted databases and onto a trusted computing node of a predetermined plurality of trusted computing nodes;
         transfer the one or more sets of sharded sensitive data to the trusted database and onto the trusted computing node, wherein the one or more sets of sharded sensitive data is transferred to the trusted database and onto the trusted computing node for obfuscating from view the set of sensitive data; and
         in response to determining at least a partial completion of the execution of the one or more user interactions with the different decoy data, store a log of the generatively presented sequences of different decoy data and the execution of the one or more user interactions with the different decoy data.

2. The system of claim 1, wherein the one or more generative machine-learning models comprises one or more classical machine-learning (CML) models, one or more quantum machine-learning (QML) models, or a combination thereof.

3. The system of claim 1, wherein the one or more processors are further configured to uniquely identify the user based at least in part on the generatively presented sequences of different decoy data and the execution of the one or more user interactions with the different decoy data.

4. The system of claim 1, wherein the one or more processors are further configured to detect the interaction to initiate the execution of one or more user interactions with the set of sensitive data as corresponding to an adversarial interaction.

5. The system of claim 1, wherein the one or more processors are further configured to store the one or more sets of sharded sensitive data as one or more quantum bits (QuBits) of data to a quantum memory of the system.

6. The system of claim 1, wherein the one or more sets of sharded sensitive data comprises one of a plurality of sets of sharded sensitive data into which the set of sensitive data is partitioned, and wherein the one or more processors are further configured to:

prior to detecting the interaction to initiate the execution of one or more user interactions with the set of sensitive data, train the one or more generative machine-learning models based at least in part on the plurality of sets of sharded sensitive data.

7. The system of claim 1, wherein the one or more processors are further configured to transfer the one or more sets of sharded sensitive data to the trusted database and onto the trusted computing node to transfer the one or more sets of sharded sensitive data to a distinct quorum computing node.

8. A method, comprising:

detecting an interaction to initiate an execution of one or more user interactions with a set of sensitive data associated with at least one instance of a software application, and, in response:

executing one or more generative machine-learning models trained to generatively present sequences of different decoy data to a user in response to an execution of one or more user interactions with the different decoy data; and while generatively presenting the sequences of different decoy data to the user:

partitioning the set of sensitive data into one or more sets of sharded sensitive data to be transferred to a trusted database of a predetermined plurality of trusted databases and onto a trusted computing node of a predetermined plurality of trusted computing nodes;

transferring the one or more sets of sharded sensitive data to the trusted database and onto the trusted computing node, wherein the one or more sets of sharded sensitive data is transferred to the trusted database and onto the trusted computing node for obfuscating from view the set of sensitive data; and in response to determining at least a partial completion of the execution of the one or more user interactions with the different decoy data, storing a log of the generatively presented sequences of different decoy data and the execution of the one or more user interactions with the different decoy data.

9. The method of claim 8, wherein the one or more generative machine-learning models comprises one or more classical machine-learning (CML) models, one or more quantum machine-learning (QML) models, or a combination thereof.

10. The method of claim 8, further comprising uniquely identifying the user based at least in part on the generatively presented sequences of different decoy data and the execution of the one or more user interactions with the different decoy data.

11. The method of claim 8, further comprising detecting the interaction to initiate the execution of one or more user interactions with the set of sensitive data as corresponding to an adversarial interaction.

12. The method of claim 8, further comprising:

storing the one or more sets of sharded sensitive data as one or more quantum bits (QuBits) of data to a quantum memory.

13. The method of claim 8, wherein the one or more sets of sharded sensitive data comprises one of a plurality of sets of sharded sensitive data into which the set of sensitive data is partitioned, the method further comprising:

prior to detecting the interaction to initiate the execution of one or more user interactions with the set of sensitive data, train the one or more generative machine-learning models based at least in part on the plurality of sets of sharded sensitive data.

14. The method of claim 8, further comprising transferring the one or more sets of sharded sensitive data to the trusted database and onto the trusted computing node to transfer the one or more sets of sharded sensitive data to a distinct quorum computing node.

15. A non-transitory computer-readable medium storing instructions that, when executed by one or more processors, cause the one or more processors to:

detect an interaction to initiate an execution of one or more user interactions with a set of sensitive data associated with at least one instance of a software application, and, in response:

execute one or more generative machine-learning models trained to generatively present sequences of different decoy data to a user in response to an execution of one or more user interactions with the different decoy data; and while generatively presenting the sequences of different decoy data to the user:

partition the set of sensitive data into one or more sets of sharded sensitive data to be transferred to a trusted database of a predetermined plurality of trusted databases and onto a trusted computing node of a predetermined plurality of trusted computing nodes;

transfer the one or more sets of sharded sensitive data to the trusted database and onto the trusted computing node, wherein the one or more sets of sharded sensitive data is transferred to the trusted database and onto the trusted computing node for obfuscating from view the set of sensitive data; and in response to determining at least a partial completion of the execution of the one or more user interactions with the different decoy data, store a log of the generatively presented sequences of different decoy data and the execution of the one or more user interactions with the different decoy data.

16. The non-transitory computer-readable medium of claim 15, wherein the one or more generative machine-learning models comprises one or more classical machine-learning (CML) models, one or more quantum machine-learning (QML) models, or a combination thereof.

17. The non-transitory computer-readable medium of claim 15, wherein the instructions further cause the one or more processors to uniquely identify the user based at least in part on the generatively presented sequences of different decoy data and the execution of the one or more user interactions with the different decoy data.

18. The non-transitory computer-readable medium of claim 15, wherein the instructions further cause the one or more processors to detect the interaction to initiate the execution of one or more user interactions with the set of sensitive data as corresponding to an adversarial interaction.

19. The non-transitory computer-readable medium of claim 15, wherein the instructions further cause the one or more processors to store the one or more sets of sharded sensitive data as one or more quantum bits (QuBits) of data to a quantum memory.

20. The non-transitory computer-readable medium of claim 15, wherein the one or more sets of sharded sensitive data comprises one of a plurality of sets of sharded sensitive data into which the set of sensitive data is partitioned, and wherein the instructions further cause the one or more processors to:

prior to detecting the interaction to initiate the execution of one or more user interactions with the set of sensitive data, train the one or more generative machine-learning models based at least in part on the plurality of sets of sharded sensitive data.

\* \* \* \* \*